Figure 1:
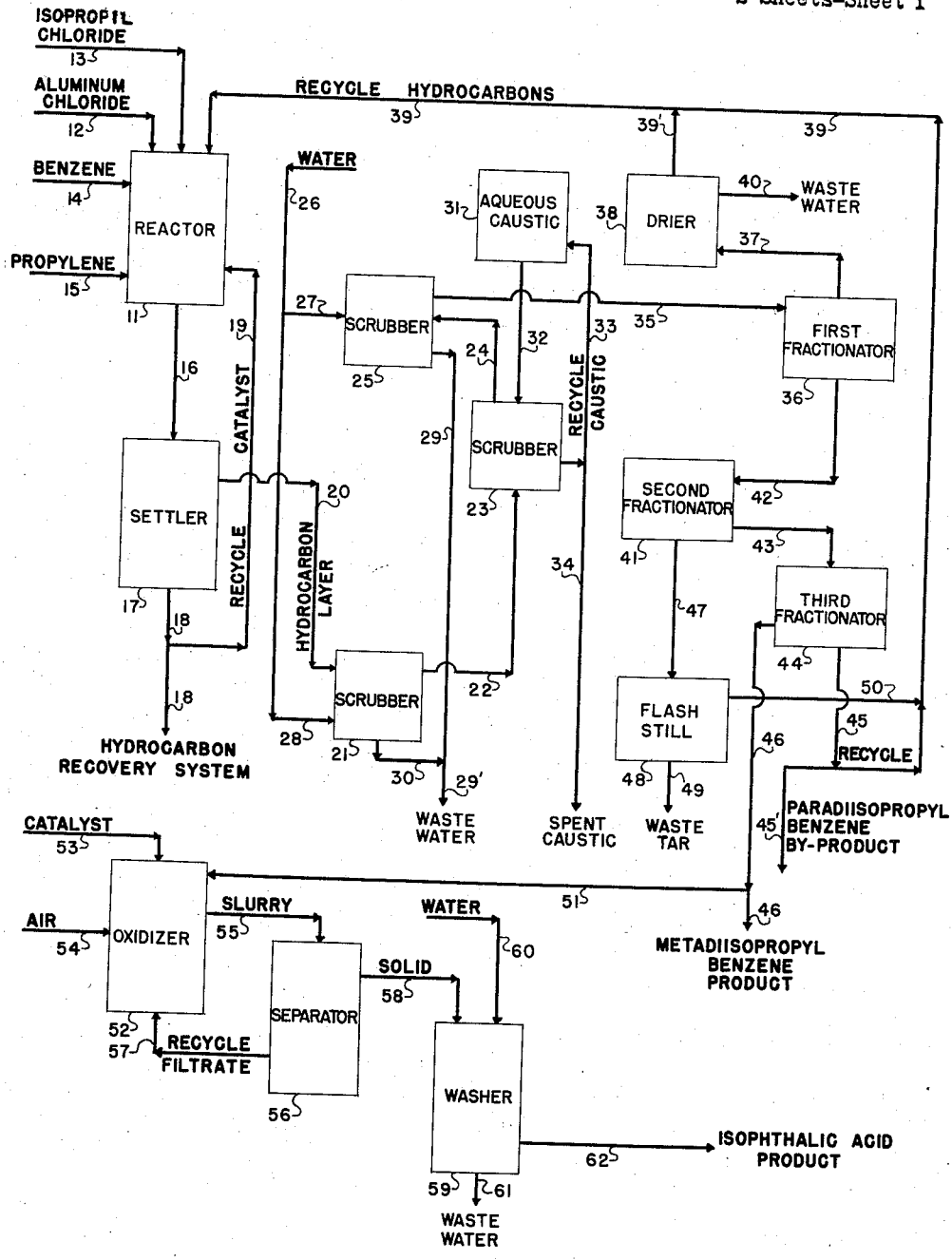

United States Patent Office 2,855,430
Patented Oct. 7, 1958

2,855,430

PROCESS FOR THE PREPARATION OF DIISOPROPYLBENZENE

Ralph Landau, Roslyn Heights, N. Y., Robert B. Egbert, Stamford, Conn., and Alfred Saffer, Bayside, N. Y., assignors, by mesne assignments, to Mid-Century Corporation, Chicago, Ill., a corporation of Delaware Application December 12, 1956, Serial No. 630,725

21 Claims. (Cl. 260—671)

This invention relates to a process for the preparation of high purity para-diisopropylbenzene and/or high strength meta-diisopropylbenzene from benzene and propylene, and more particularly to a process wherein one mol of benzene is reacted with about two mols of propylene in the presence of an acid reacting alkylation catalyst, such as aluminum chloride, to produce a reaction mixture containing the isomeric diisopropylbenzenes together with mono-isopropylbenzene and also higher poly-isopropylbenzenes, separating the isomeric diisopropylbenzene fraction therefrom, and then separating the para- or meta-diisopropylbenzene from the latter fraction.

The reaction of benzene with propylene in the presence of an acid reaction catalyst, such as aluminum chloride, is well known. Generally, the reaction products obtained thereby consist largely of mixtures of the various isopropylbenzenes. The art is confronted by the problem, as to any such process, of obtaining the desired high purity para-diisopropylbenzene or high strength meta-diisopropylbenzene in high overall yield, based upon the initial reactants.

It has been found, in accordance with the invention, that the isomeric diisopropylbenzenes may be fractionated from such a reaction mixture; and the para- and meta-diisopropylbenzene may be fractionated from the latter fraction, in a convenient and economic manner. The mono-isopropylbenzene (cumene), the undesired diisopropylbenzenes and the higher poly-isopropylbenzenes, together with any unreacted benzene, may be recycled to the reactor and converted to the desired diisopropylbenzene; the latter being substantially the only product removed from the system. In this way, very high yields of high purity para-diisopropylbenzene or high strength meta-diisopropylbenzene are obtained, based upon the initial reactants.

The objects achieved in accordance with the invention as described herein include the provision of a process for obtaining high purity para-diisopropylbenzene or high strength meta-diisopropylbenzene by the reaction of benzene and propylene in the presence of an acid reacting alkylation catalyst; the provision of a continuous process of reacting benzene and propylene in the presence of aluminum chloride, separating the resulting reaction mixture, and recovering high purity para-diisopropylbenzene or high strength meta-diisopropylbenzene therefrom, and recycling the other constituents of this reaction mixture to the initial reaction system, whereby a high yield of para-diisopropylbenzene or meta-diisopropylbenzene is obtained based upon the benzene and propylene reactants consumed; the provision of a process for obtaining high purity para-diisopropylbenzene or high strength meta-diisopropylbenzene from the reaction product of benzene and propylene; and other objects which will be apparent as details or embodiments of the invention are set forth hereinafter.

In order to facilitate a clear understanding of the invention, the following preferred specific embodiments are described in detail.

Into a suitable reactor having a corrosion resistant inner surface (e. g., glass, ceramic or corrosion resistant metal or alloy), equipped with agitating means such as a gas or mechanical device, and with a means for heating or cooling the contents thereof such as a coil or jacket, a reflux condenser, a gas inlet tube, and optionally a vent for passing off low boiling materials, there are charged:

25 parts by weight of aluminum chloride
480 parts benzene (C. P. or thiophene free)
25 parts isopropyl chloride (or anhydrous hydrogen chloride); then
520 parts of propylene (e. g., 99% propylene gas)

is absorbed therein over a period of about 4 hours, with agitation, while the temperature is maintained in the range of about 70 to 100° C.; the feed rate being about 75 liters per hour at ordinary temperature and pressure. This temperature may be maintained either by passing cooling water through the indirect heat exchange means or by permitting the mixture to boil and refluxing condensate therefrom if the temperature tends to go too high, or passing steam through these means if the temperature tends to go too low.

The reaction mass is then cooled to room temperature, e. g., indirectly by means of cooling water, and then poured into about 500 parts of water; then about 100 parts of about 18% aqueous hydrochloric acid is added, and the resulting mixture agitated for about one-quarter hour. Then the mixture is allowed to stand, whereby two layers are formed. The upper hydrocarbon layer is recovered, washed with about 550 parts of about 10% aqueous sodium hydroxide, and then with about 800 parts of water, and then dried by azeotropically distilling off the water with the lower boiling hydrocarbon present. Then the hydrocarbon is fractionated in an efficient column, the following fractions being obtained from 635 parts of the fraction (989 parts total):

343 parts of a diisopropylbenzene fraction
112 parts of lower aromatics
11 parts of hexane and about
169 parts of higher aromatics (mostly triisopropylbenzene)

The diisopropylbenzene fraction is further fractionated in an efficient manner, 99 parts of para-diisopropylbenzene fraction being obtained as bottoms (boiling point 210.4° C. at 760 mm. Hg); the overhead (about 254 parts) is a mixture of the ortho (boiling point 203.8° C.) and the meta (boiling point 203.2° C.), containing 90 to 98% by weight of the latter; and this overhead is the desired product. The para-diisopropylbenzene fraction may be of 90 to 99% purity and may be returned to the reactor for use in the next batch, or it may be separated as a by-product.

The accompanying drawings are diagrammatical illustrations of the invention.

The processes of the invention may be conducted continuously, and this method is especially desirable for commercial operation. Referring to the accompanying drawing, Figure 1, into reactor 11, there are charged aluminum chloride through line 12 and isopropyl chloride through line 13; and aluminum chloride catalyst is also recycled thereto through line 19. Benzene and propylene are charged continuously thereinto through lines 14 and 15, respectively, and a part of the reaction mixture is continuously removed and passed through line 16 into settler 17, wherefrom a lower catalyst sludge layer is removed through line 18 and recycled through line 19 to the reactor 11; by-product hydrocarbons are also recycled thereto through line 39.

The upper or hydrocarbon layer is removed from the settler through line 20 and passed into the first scrubber 21 wherein it is scrubbed in a countercurrent manner with water introduced through lines 26 and 28, the waste water being removed therefrom through lines 30 and 29'. The scrubbed hydrocarbon is passed therefrom through line 22 into scrubber 23 wherein it is scrubbed in a countercurrent manner with 5–15% aqueous sodium hydroxide or the like alkaline material passed thereinto from tank 31 through line 32. The caustic is removed therefrom through line 33 and recycled to the storage tank; however, when the concentration of caustic becomes too low, e. g., below about 5%, it is discarded through line 34, and a new supply is charged into the storage tank. The hydrocarbon is removed from this scrubber through line 24 and passed into scrubber 25 wherein it is washed in a countercurrent manner with water introduced thereinto through lines 26 and 27. Spent water is withdrawn and discarded through lines 29 and 29'. The latter scrubber may be omitted if desired.

The scrubbed hydrocarbon is passed therefrom through line 35 into the first fractionating column 36. An overhead fraction is taken off and passed through a drier 38 consisting of an azeotropic distillation column. Any low boiling unwanted or by-product materials such as hexanes are also removed therefrom, and the water present therein is decanted and removed therefrom through line 40. The bottoms from this tower are returned to the reactor through lines 39' and 39. The bottoms from the first fractionator is passed to a second fractionator 41 through line 42. The diisopropylbenzene fraction is removed therefrom as overhead and passed to a third fractionator 44, through line 43. A bottoms cut is taken therefrom and recycled to the reactor through lines 45 and 39; or removed through line 45', as a by-product. The overhead from this column is the meta-diisopropylbenzene product and it is taken off through line 46.

The bottoms from the second fractionator 41 is passed through line 47 to a flash still 48 wherein the poly-isopropylbenzenes are separated therefrom as overhead and recycled to the reactor through lines 50 and 39. The remaining bottoms or tars are taken off through line 49, and may be discarded.

The meta-diisopropylbenzene product is useful as a solvent, or as an intermediate raw material for the preparation of meta-dihydroxylbenzene (resorcinol) by the so-called hydroperoxide process. One of its most important uses is, however, as an intermediate for the preparation of isophthalic acid.

Figure 2:
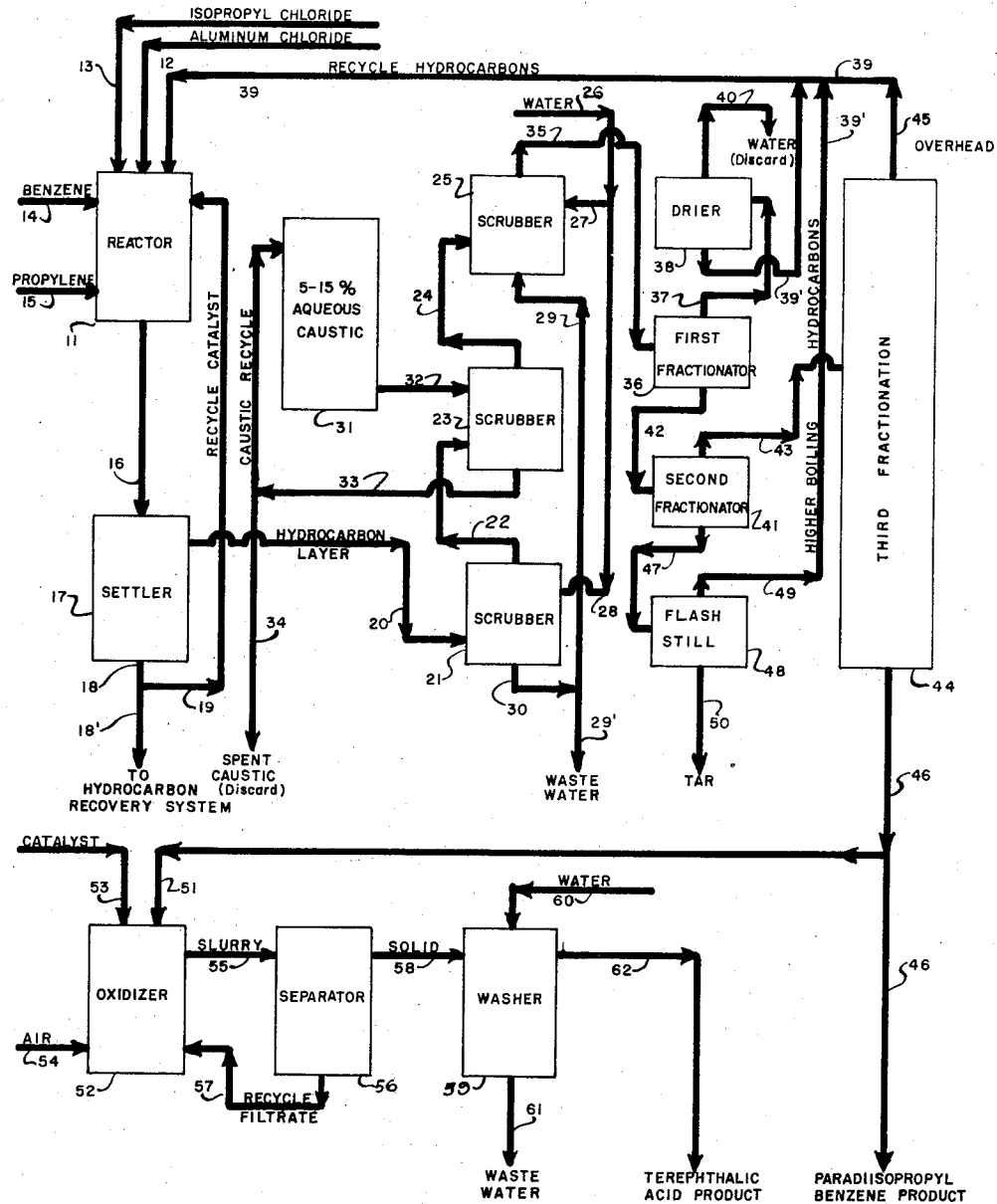

Referring to the accompanying drawing, Figure 2, into the reactor 11, there are charged aluminum chloride through line 12 and isopropyl chloride through line 13; and aluminum chloride catalyst is also recycled thereto through line 19. Benzene and propylene are charged continuously thereinto through lines 14 and 15, respectively, and a part of the reaction mixture is continuously removed and passed through line 16 into settler 17, wherefrom a lower catalyst sludge layer is removed through line 18 and recycled through line 19 to the reactor 11; by-product hydrocarbons are also recycled thereto through line 39.

The upper or hydrocarbon layer is removed from the settler through line 20 and passed into the first scrubber 21 wherein it is scrubbed in a countercurrent manner with water introduced through lines 26 and 28, the waste water being removed therefrom through lines 30 and 29'. The scrubbed hydrocarbon is passed therefrom through line 22 into scrubber 23 wherein it is scrubbed in a countercurrent manner with 5–15% aqueous sodium hydroxide or the like alkaline material passed thereinto from tank 31 through line 32. The caustic is removed therefrom through line 33 and recycled to the storage tank; however, when the concentration of caustic becomes too low, e. g. below about 5%, it is discarded through line 34, and a new supply is charged into the storage tank. The hydrocarbon is removed from this scrubber through line 24 and passed into scrubber 25 wherein it is washed in a countercurrent manner with water introduced thereinto through lines 26 and 27. Spent water is withdrawn and discarded through lines 29 and 29'. The latter scrubber may be omitted if desired.

The scrubbed hydrocarbon is passed therefrom through line 35 into the first fractionating column 36. An overhead fraction is taken off and passed through a drier 38 consisting of an azeotropic distillation column. Any low boiling unwanted or by-product materials such as hexanes are also removed therefrom, and the water present therein is decanted and removed therefrom through line 40. The bottoms from this tower are returned to the reactor through lines 39' and 39. The bottoms from the first fractionator is passed to a second fractionator 41 through line 42. The diisopropylbenzene fraction is removed therefrom as overhead and passed to a third fractionator 44, through line 43. An overhead cut is taken therefrom and recycled to the reactor through lines 45 and 39. The bottoms from this column is the pure diisopropylbenzene product and it is taken off through line 46.

The bottoms from the second fractionator 41 is passed through line 47 to a flash still 48 wherein the poly-isopropylbenzenes are separated therefrom as overhead and recycled to the reactor through lines 50 and 39. The remaining bottoms or tars are taken off through line 49, and may be discarded.

The para-diisopropylbenzene product is useful as a solvent, or as an intermediate raw material for the preparation of para-dihydroxybenzene (hydroquinone) by the so-called hydroperoxide process. One of its most important uses is, however, as an intermediate for the preparation of terephthalic acid.

The invention is associated with the surprising discovery that at or near equilibrium the mixture from the reactor may contain up to about 55% (by weight) of diisopropylbenzene; and of this fraction or cut, up to about 50% desired diisopropylbenzene (about 27% overall) can be recovered or separated. This maximum is closely approached or attained for practical purposes if the ratio of propyl reactant (propylene added plus isopropyl groups in the recycle) to total benzene is in the range of 1.6–2.5 mols of the propyl reactant per mol of benzene, desirably 1.8–2.0, and preferably about 1.9. At or near the maximum efficiency of the system, the ratio of isopropyl groups to benzene in the recycled hydrocarbon mixture is about 1.7, so a ratio of 2.0 mols of propylene per mol of benzene is required in the fresh feed in order that the ratio of the propyl reactant to benzene in the reactor is about 1.9 mols. Below the ratio of about 1.6, the reaction mixture contains an excessive amount of mono-isopropylbenzene and also of unreacted benzene; and above the ratio of about 2.5, it contains an excessive amount of triisopropylbenzene and may contain higher homologues.

Readily available propylene stocks may be used, preferably free of other unsaturates. The reactor system may be provided with vents to pass off lower boiling hydrocarbons which do not react therein. A hexane fraction or a cumene fraction, or both, may be removed as overhead, instead of recycling them to the reactor.

The benzene reactant should be free from other aromatics (except cumene) and may contain some paraffins, which may be separated out in the system; desirably it is of low sulfur content, and preferably sulfur free.

Comparable results to the foregoing are obtained with various modifications. The hydrocarbon reaction catalyst may be any inorganic acid reacting alkylation catalyst, such as hydrogen fluoride, boron trifluoride, and the like. The reaction temperature may be in the range of −80 to 150° C., preferably 50 to 110° C. for the aluminum chloride catalyst. The reaction time may be in the range of 0.1 to 10 hours, preferably 0.5 to 4 hours. Higher temperatures are generally associated with shorter times, and the catalyst, temperature and time conditions are selected to give the desired conversion at the desired throughput rates. Additional aluminum chloride catalyst may be added as required (e. g., as determined by a spot check alkylation reaction using as catalyst a sample of the sludge being recycled for catalytic activity). The spent catalyst is treated with water containing 15–30% hydrochloric acid, to break the catalyst complex, and the resulting hydrocarbon phase is separated and reused in the system.

A highly desirable feature of the process of the invention is that the propylene and benzene reactants may be converted to the desired dicarboxylic acid in substantially theoretical yield without obtaining economically undesirable amounts of by-products. From the economic viewpoint, this is highly desirable, inasmuch as the commercial utility of the process is directly related substantially to the desired product terephthalic or isophthalic acid.

It is indeed surprising that the process of the invention may be carried out in such a convenient manner, with high conversions to give a substantial yield of the desired product; especially when one considers the rather devious and costly methods employed by the art heretofore for the preparation of isophthalic or terephthalic acid.

This application is a continuation-in-part of applications Serial Number 305,972, filed August 23, 1952 and Serial Number 394,318, filed November 25, 1953, both now abandoned.

In view of the foregoing discussions, variations and modifications of the invention will be apparent to one skilled in the art, and it is intended to include within the invention all such variations and modifications except as do not come within the scope of the appended claims.

What we claim is:

1. In a process for the preparation of high strength meta-diisopropylbenzene, suitable for direct conversion into high purity isophthalic acid, the steps of reacting benzene with propylene in the presence of an inorganic acid reacting alkylation catalyst chosen from the group consisting of aluminum chloride, hydrogen fluoride and boron tri-fluoride to produce a reaction mixture containing a major portion of the isomeric diisopropylbenzenes together with mono-isopropylbenzene and higher polyisopropylbenzenes, separating the isomeric diisopropylbenzene fraction therefrom and then separating high strength meta-diisopropylbenzene from the latter, and recycling the para-diisopropylbenzene and mono-isopropylbenzene and the higher poly-isopropylbenzenes to the reaction step, said reaction step being conducted at a temperature in the range of −80 to 150° C., at a time in the range of about 0.1 to 10 hours, the ratio of mols of total reactant per mol of benzene in said reaction step being in the range of about 1.6 to 2.5, whereby high strength meta-diisopropylbenzene is substantially the only product removed from the system.

2. A process of claim 1 in which the catalyst is aluminum chloride.

3. A process of claim 2 in which the reaction step is conducted at a temperature in the range of 50 to 110° C.

4. A process of claim 2 in which the reaction step is conducted at a temperature in the range of 70–100° C.

5. A process of claim 1 in which the catalyst is hydrogen fluoride.

6. A process of claim 1 in which the catalyst is boron fluoride.

7. A process of claim 1 conducted in a continuous manner.

8. In a cyclic process for the preparation of a diisopropylbenzene chosen from the class consisting of high purity para-diisopropylbenzene and high strength meta-diisopropylbenzene, the steps of contacting benzene, propylene, mono-isopropylbenzene, diisopropylbenzene and higher poly-isopropylbenzenes in the presence of an inorganic acid reacting alkylation catalyst chosen from the group consisting of aluminum chloride, hydrogen fluoride and boron tri-fluoride, to produce a reaction mixture containing a major portion of the isomeric diisopropylbenzenes together with mono-isopropylbenzene and higher poly-isopropylbenzenes, separating the diisopropylbenzene fraction therefrom and separating from the latter at least one of the isomeric diisopropylbenzenes, and recycling the remaining diisopropylbenzenes and the monoisopropylbenzenes and the higher poly-isopropylbenzenes to the reaction step, said reaction step being conducted to a temperature in the range of −80 to 150° C., a time in the range of 0.1 to 10 hours and a ratio in the range of about 1.6 to 2.5 mols of total propyl reactant per mol of benzene.

9. In a process for the preparation of high purity para-diisopropylbenzene, suitable for direct conversion into high purity terephthalic acid, the steps of reacting benzene with propylene in the presence of an inorganic acid reacting alkylation catalyst chosen from the group consisting of aluminum chloride, hydrogen fluoride and boron tri-fluoride to produce a reaction mixture containing a major portion of the isomeric diisopropylbenzenes together with mono-isopropylbenzene and higher polyisopropylbenzenes, separating the diisopropylbenzene fraction therefrom and separating high purity para-diisopropylbenzene from the latter, and recycling the remaining diisopropylbenzenes and the mono-isopropylbenzene and the higher poly-isopropylbenzenes to the reaction step, said reaction step being conducted at a temperature in the range of −80 to 150° C., a time in the range of 0.1 to 10 hours and a ratio in the range of about 1.6 to 2.5 mols of total propyl reactant per mol of benzene, whereby high purity para-diisopropylbenzene is substantially the only product removed from the system.

10. A process of claim 9 in which the catalyst consists of aluminum chloride.

11. A process of claim 9 in which the catalyst consists of hydrogen fluoride.

12. A process of claim 9 in which the catalyst consists of boron tri-fluoride.

13. A process for the preparation of high purity para-diisopropylbenzene comprising reacting benzene with propylene in the presence of an acid reacting alkylation catalyst chosen from the group consisting of aluminum chloride, hydrogen fluoride and boron tri-fluoride to produce a reaction mixture containing the isomeric diisopropylbenzenes together with mono-isopropylbenzene and higher poly-isopropylbenzenes, separating the diisopropylbenzene fraction therefrom and separating high purity para-diisopropylbenzene from the latter, and recycling the remaining diisopropylbenzenes and the mono-isopropylbenzene and higher polyisopropylbenzenes to the reaction step, said reaction step being conducted at a temperature in the ranges of −80 to 150° C., at a time in the range of 0.1 to 10 hours, and a ratio in the range of about 1.6 to 2.5 mols of total propyl reactant per mol of benzene whereby a substantially theoretical yield of para-diisopropylbenzene is obtained.

14. A process of claim 13 wherein the catalyst is aluminum chloride.

15. A process of claim 13 in which the catalyst is hydrogen fluoride.

16. A process of claim 13 wherein the catalyst is boron fluoride.

17. A process of claim 14 conducted in a continuous manner.

18. A process of claim 10 conducted in a continuous manner.

19. A process of claim 10 in which the reaction step is conducted at a temperature in the range of 50 to 110° C., and the ratio of mols of total propyl reactant per mol of benzene is in the range of 1.8 to 2.0.

20. A process of claim 19 wherein the ratio of mols of propyl reactant per mol of benzene is about 1.9.

21. In a cyclic process for the preparation of high purity para-diisopropylbenzene suitable for direct conversion into high purity terephthalic acid, the steps of contacting benzene, propylene, mono-isopropylbenezne, ortho- and meta-diisopropylbenzenes and higher poly-isopropylbenzenes in the presence of an inorganic acid reacting alkylation catalyst chosen from the group consisting of aluminum chloride, hydrogen fluoride and boron tri-fluoride, to produce a reaction mixture containing a major portion of the isomeric diisopropylbenzenes together with mono-isopropylbenzene and higher poly-isopropylbenzenes, separating the diisopropylbenzene fraction therefrom and separating high purity para-diisopropylbenzene from the latter, and recycling the remaining diisopropylbenzenes and the mono-isopropylbenzene and the higher poly-isopropylbenzenes to the reaction step, said reaction step being conducted at a temperature in the range of —80 to 150° C., at a time in the range of 0.1 to 10 hours and a ratio in the range of about 1.6 to 2.5 mols of total propyl reactant per mol of benzene, whereby high purity para-diisopropylbenzene is substantially the only product removed from the system.

References Cited in the file of this patent

UNITED STATES PATENTS

| | | |
|---|---|---|
| 2,275,312 | Tinker et al. | Mar. 3, 1942 |
| 2,403,785 | Britton et al. | July 9, 1946 |

OTHER REFERENCES

Slanina et al.: J. Am. Chem. Soc., vol. 57 (1935), pages 1547–9.

Newton: J. Am. Chem. Soc., vol. 65 (1943), pages 320–3.